(12) United States Patent
Singer et al.

(10) Patent No.: US 7,998,589 B2
(45) Date of Patent: Aug. 16, 2011

(54) ARTICLE HAVING A WEAR-RESISTANT COATING AND PROCESS FOR PRODUCING THE SAME

(75) Inventors: Kevin M. Singer, Louisville, KY (US); Donald W. Bucholz, Charlestown, IN (US)

(73) Assignee: Kennametal Inc., Latrobe, PA (US)

( * ) Notice: Subject to any disclaimer, the term of this patent is extended or adjusted under 35 U.S.C. 154(b) by 844 days.

(21) Appl. No.: 11/052,144

(22) Filed: Feb. 7, 2005

(65) Prior Publication Data

US 2006/0177677 A1    Aug. 10, 2006

(51) Int. Cl.
  *B32B 5/16*     (2006.01)
  *B32B 15/00*    (2006.01)
  *B32B 15/18*    (2006.01)

(52) U.S. Cl. ........ 428/457; 428/469; 428/553; 428/625; 228/262.9

(58) Field of Classification Search .................. None
  See application file for complete search history.

(56) References Cited

U.S. PATENT DOCUMENTS

| | | |
|---|---|---|
| 3,743,556 A | 7/1973 | Breton et al. |
| 3,918,217 A | 11/1975 | Oliver |
| 4,173,685 A | 11/1979 | Weatherly |
| 5,276,075 A | 1/1994 | Santini |
| 5,891,204 A | 4/1999 | Neff |
| 6,649,682 B1 | 11/2003 | Breton et al. |

FOREIGN PATENT DOCUMENTS

JP    2002346456 A2    12/2002

OTHER PUBLICATIONS

PCT/US06/03992 Notification of Transmittal of the International Search Report and Written Opinion mailed Feb. 28, 2008 (1 page).
PCT/US06/03992 Written Opinion of the International Searching Authority mailed Feb. 28, 2008 (6 pages).
PCT/US06/03992 International Search Report mailed Feb. 28, 2008 (3 pages).
PCT/US06/03992 Response to Written Opinion transmitted to PCT Apr. 22, 2008 (4 pages).

*Primary Examiner* — Timothy Speer
*Assistant Examiner* — Jason Savage
(74) *Attorney, Agent, or Firm* — Matthew W. Gordon

(57) ABSTRACT

An article, as well as the process of producing the article, wherein the article is produced by a process that includes the steps of providing a substrate; applying a viscous coating that contains a ferromagnetic or paramagnetic component to at least a selected portion of the substrate; causing the selected portion of the substrate to be under the influence of a magnetic field; and transforming the viscous coating so as to form a wear-resistant coating on the substrate.

21 Claims, 6 Drawing Sheets

ARTICLE HAVING A WEAR-RESISTANT COATING AND PROCESS FOR PRODUCING THE SAME

BACKGROUND OF THE INVENTION

The invention pertains to an article that has a wear-resistant coating as well as to a process for producing such article that has a wear-resistant coating. More specifically, the invention pertains to an article that comprises a substrate and a wear-resistant coating as well as to a process for producing such article that comprises a substrate and a wear-resistant coating.

In industrial processes, components of machinery and the like are often times subjected to wear. The same is true for many other articles in that they are often times subjected to wear. It has proven to be beneficial to protect these articles (including components) from wear. A well-accepted way to provide such protection against wear of an article is to apply a wear-resistant coating thereto.

One common method of applying a wear-resistant coating is by a thermal spray method. Thermal spray methods include processes that use detonation guns, high velocity oxygen flame spraying, plasma spraying, wire arc spraying, and flame spraying. There are, however, disadvantages associated with applying coatings via thermal spray methods. Except for vacuum plasma spraying, thermal spraying exposes the powders being sprayed to oxygen or water vapor so as to result in the formation of metal oxides that can be detrimental to the coating. There is a limitation to the scope of the articles that are suitable for coating via thermal spray methods because there must a line of sight between the end of the spray nozzle and the surface to be coated. Further, if the angle of impingement of the spray on the substrate is not constant, it is possible to deposit undesirable non-uniform coatings. U.S. Pat. No. 4,173,685 to Weatherly discloses the application of a wear and corrosion resistant coating to a substrate via a plasma or a d-gun technique.

Another process for applying wear-resistant coatings is described in U.S. Pat. No. 3,743,556 to Breton et al. The '556 Breton et al. patent discloses a process for applying a wear-resistant coating that first applies a cloth that contains particles of tungsten carbide to a surface that requires protection against wear. Second, another piece of cloth that contains particles of a braze alloy is positioned over the cloth that contains the carbide particles. The substrate with the two layers of cloth is placed in an inert-atmosphere furnace and then heated to the brazing temperature of the braze alloy. The braze alloy infiltrates down into the carbide particles and brazes them to each other and to the substrate. Although this process produces a wear-resistant coating, this process has limitations with respect to applying a thin coating layer, as well as limitations as to the geometry of the component since the component must be accessed with fingers or tools. The cloth process also can sometimes present seams in the wear-resistant coating that can result in structural discontinuities in the carbide coating.

U.S. Pat. No. 6,649,682 B1 to Breton et al. discloses a paint system and process for hardfacing metal surfaces. In the '682 Brenton et al. patent, a paint that includes a dispersion of hard particles is first applied as a coating to the surface of the substrate. Next, a paint including a dispersion of braze alloy is applied over the layer of hard particles. The substrate is then heated to cause the braze alloy to melt and infiltrate into the hard particles thereby bonding them to the metallic surface. The '682 Brenton et al. patent also discloses an embodiment of the process wherein a first layer of adhesive is applied to the substrate and a hardfacing powder is then applied to the adhesive. A second layer of adhesive is applied and a braze alloy powder is applied to the second adhesive. The substrate is then heated whereby the braze alloy melts and infiltrates into the hard particles so as to bond them to the metallic surface. In a third embodiment of the '652 Brenton et al. patent, a hardfacing alloy powder containing precipitated intermetallic hard compounds is made into a paint and applied to the surface that is to be protected. After drying, the paint is heated to from a coating. In a fourth embodiment, hardfacing particles and braze alloy powder are made into a paint and applied to the surface to be protected. The paint is then dried and heated to form the coating.

In a process such as that disclosed in '682 Breton et al. patent, in order to obtain a layer of the paint that includes a dispersion of hard materials that has sufficient thickness, it takes multiple coats (or dips) of the substrate into the paint to achieve the necessary cladding thickness. At sharp corners or edges of the substrate the paint has a tendency to pull away which results in a thinner cladding and a premature wear in these areas adjacent to the sharp corners or edges of the substrate.

It would thus be desirable to provide a coating process, as well as an article produced by the process, wherein the coating is not subject to oxidation such as is the case for coatings applied by thermal spray techniques.

It would thus be desirable to provide a coating process, as well as an article produced by the process, wherein the coating can be applied in a consistent fashion to the substrate so as to result in a uniform coating It would thus be desirable to provide a coating process, as well as an article produced by the process, wherein the coating can be a relatively thin coating.

It would thus be desirable to provide a coating process, as well as an article produced by the process, wherein the coating can be applied to components or surfaces of components that are not accessible (or easily accessible) by hand or tools.

It would thus be desirable to provide a coating process, as well as an article produced by the process, wherein the wear-resistant coating is without seams.

It would thus be desirable to provide a coating process, as well as an article produced by the process, wherein it would not be necessary to use multiple coats or dips of a coating paint on a substrate to achieve the necessary coating (cladding) thickness.

It would also be highly desirable to provide a coating process, as well as an article produced by such process, wherein the thickness of the coating (or cladding) is sufficient at sharp corners or edges of the substrate so as to provide adequate wear resistance in these areas.

It would also be highly desirable to provide a coating process, as well as an article produced by such process, wherein the thickness of the coating (or cladding) at selected locations can be varied so that the substrate can have a coating that has a selectively variable thickness.

SUMMARY OF THE INVENTION

In one form thereof, the invention is an article produced by a process that comprises the steps of: providing a substrate; applying a viscous coating that contains a ferromagnetic or paramagnetic component to at least a selected portion of the substrate; causing the selected portion of the substrate to be under the influence of a magnetic field; and transforming the viscous coating so as to form a wear-resistant coating on the substrate.

In another form thereof, the invention an article produced by a process comprising the steps of: providing a substrate;

contacting the substrate with a viscous coating wherein the viscous coating contains a ferromagnetic or paramagnetic component; causing at least a portion of the viscous coating to be under the influence of a magnetic field; and transforming the viscous coating into a wear-resistant coating adhered to the substrate.

In still another form, the invention is an article produced by a process comprising the steps of providing a magnetically permeable substrate; causing at least a selected portion of the substrate to be under the influence of a magnetic field; contacting the selected portion of the substrate with a viscous coating wherein the viscous coating contains hard particles and a braze material wherein the viscous coating contains a ferromagnetic or paramagnetic component; and transforming the viscous coating to a wear-resistant coating adhered to the substrate.

BRIEF DESCRIPTION OF THE DRAWINGS

The following is a brief description of the drawings that form a part of this patent application.

DETAILED DESCRIPTION OF THE INVENTION

Figure 1:
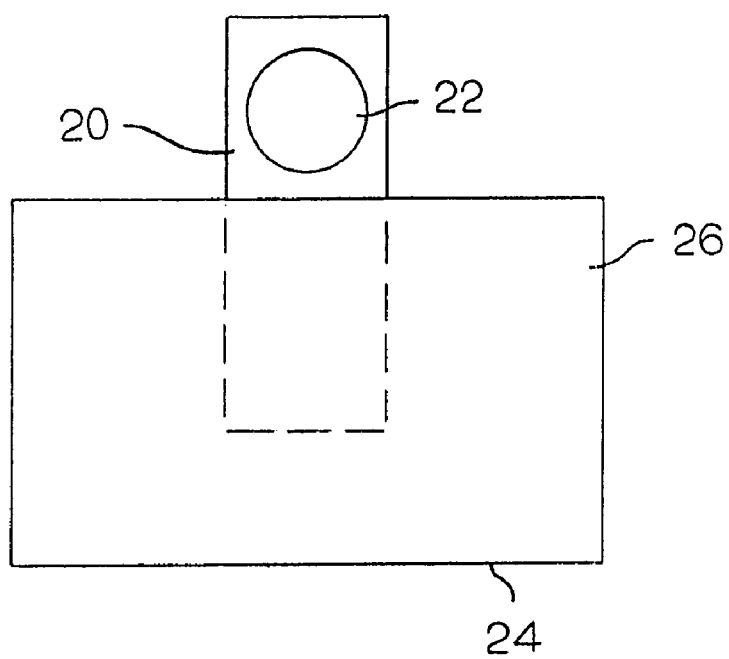
FIG. 1 is a mechanical schematic view of a first specific embodiment for applying a coating to a substrate wherein a single magnet is attached to the near side surface of the substrate.

Referring to the drawings, FIG. 1 is a mechanical schematic view that illustrates an arrangement for applying a coating to a substrate. In this specific embodiment, the substrate 20 should be a magnetically permeable material such as, for example, a ferromagnetic material or a paramagnetic material. Exemplary suitable substrates include: carbon and alloy steels, tool steels, martensitic and ferritic stainless steels. In this arrangement, the substrate 20 is illustrated as a generally rectangular planar geometry. It should be appreciated that the substrate can take on virtually any geometry so long as it can be immersed into the viscous coating material 26 or the viscous coating can be applied via other techniques. As discussed hereinafter, the substrate 20 can be a permanent magnet. The substrate can also comprise a non-magnetic material. Thus, it can be seen that the present process has application to a wide variety of articles.

In this specific embodiment, the substrate 20 has a magnet 22 applied thereto. Although the magnet is illustrated as generally cylindrical (or circular), it should be appreciated that magnets of different sizes and shapes can be attached to (or positioned adjacent to) the substrate 20. The attachment of the magnet 22 to the surface of the substrate 20 causes a magnetic field to be applied to at least certain portions of the substrate 20 (i.e., this portion of the substrate is under the influence of a magnetic field) and there is the possibility that a magnetic field may not be applied to other portions of the substrate which means that these other portions are not under the influence of a magnetic field. It should be appreciated that magnets may be positioned on the substrate so that a magnetic field is applied to the entire substrate.

In this patent application, the use of the term magnetic field is intended to mean a magnetic field that is above the earth's ambient magnetic field.

The arrangement further includes a container 24 that contains a viscous coating material 26 into which the substrate 20 is immersed (or dipped) so as to apply the coating 26 to the substrate 20. It should be appreciated that the viscous coating may be applied by other techniques such as, for example, painting. The viscous coating material contains a ferromagnetic or paramagnetic component that is a cemented hard particle. One preferred example of a suitable hard particle is cobalt cemented tungsten carbide particles. Other examples of suitable cemented hard particles, in addition to cemented tungsten carbide, include one or more of cemented vanadium carbide, cemented niobium carbide, cemented chromium carbide, cemented titanium carbide and cemented tantalum carbide. The cemented hard particles can include any one or more of nickel, cobalt, iron and their alloys, as well as copper-based alloys or aluminum-based alloys.

In addition to the hard particles, the viscous coating material contains a braze material. The braze material can comprise the ferromagnetic or paramagnetic component of the viscous coating material. One exemplary braze material is a nickel-chromium-boron braze alloy. The viscous coating material can contain additional components (e.g., a polymeric agent) that assist in the flowability and application of the coating to the substrate. Additional descriptions of the hard particles, the braze material and other components of the viscous coating material are set out hereinafter.

It should be appreciated that applicants contemplate that the ferromagnetic or paramagnetic component of the viscous coating material can comprise the hard particles and the braze material.

The substrate 20 is then removed from the container 24 and the coating is allowed to dry and solidify. It is typical that the coating air dries. It is also contemplated that heat can be applied to the coating to assist in the drying thereof. As will become apparent from the discussion below, the magnet can either be immediately removed from the substrate after the substrate has been removed from the viscous coating material or the magnet may remain on the substrate until the coating has dried, i.e., become solid.

Once the coating has dried, either with or without the application of heat, the substrate with the dried coating thereon is heated to a temperature above the solidus of the braze material to effect the metallurgical bonding of the hard particles to the braze material. This heating step is the final step in the process that solidifies (or transforms) the viscous coating into a wear-resistant coating on the substrate. As can be appreciated the temperatures can vary depending upon the properties of the braze material, but exemplary temperatures range between a lower limit equal to about 875° C. and an upper limit equal to about 1230° C. It should also be appreciated that the heating process to effect the metallurgical bonding may include multiple steps. Exemplary heating processes to effect the metallurgical bonding are set forth in U.S. Pat. No. 6,649,682 to Brenton et al. which is hereby incorporated by reference herein.

Figure 1A:
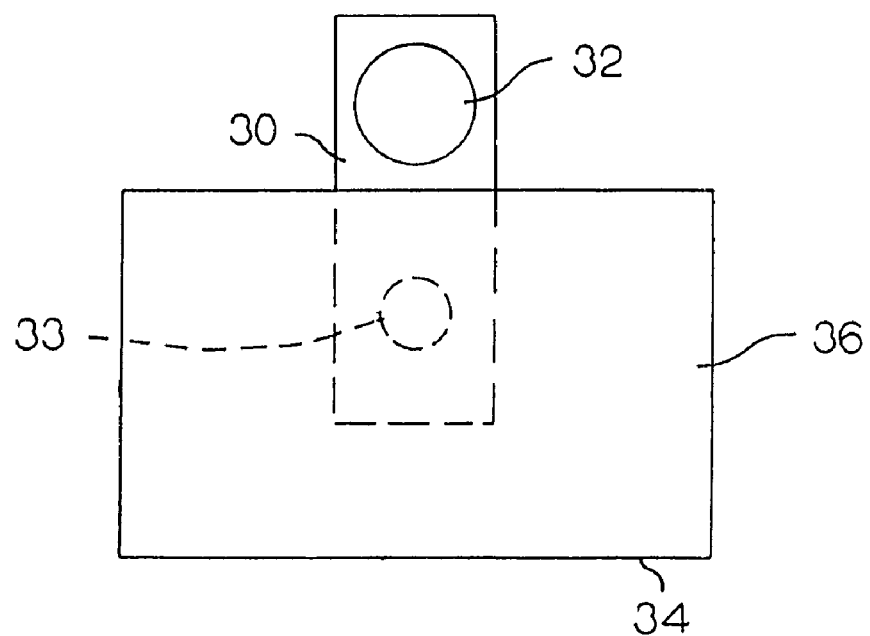
FIG. 1A is a mechanical schematic view of a second specific embodiment for applying a coating to a substrate wherein a pair (i.e., a plurality) of magnets is attached to the near side surface of the substrate.

FIG. 1A is a mechanical view that illustrates a second specific embodiment of an assembly by which one can apply the coating to a substrate 30. This assembly includes a substrate 30 that has a pair of magnets (32, 33) applied to the rear surface thereof. It can be appreciated that a magnetic field can be applied to more than one portion of the substrate wherein magnets are located on only one side surface. It is also contemplated that magnets can be positioned on both side surfaces of a substrate like substrate 30.

Like for the first arrangement, in order to apply the coating, the substrate 30 is immersed (or dipped) into a container 34 that contains the viscous coating 36. The substrate 30 is then removed from the container 34 and the coating is allowed to dry and solidify. The magnets can either be immediately removed from the substrate after the substrate has been removed from the viscous coating material or the magnets may remain on the substrate until the coating has dried, i.e., become solid.

In a specific embodiment in which one or more magnets are positioned on the surface of the substrate, each magnet will cause at least a portion of the substrate to be under the influence of a magnetic field. Each magnet will not, however, typically cause the entire substrate to be under the influence of the magnetic field which means that another portion of the substrate is not under the influence of the magnetic field. In such a situation, it can be expected that the thickness of the wear-resistant coating in the vicinity of the portion of the substrate under the influence of the magnetic field will be thicker than the thickness of the wear-resistant coating in the vicinity of those portion(s) of the substrate not under the influence of the magnetic field. It can thus be appreciated that the placement and the strength of the magnets produces a substrate with a wear-resistant coating wherein the wear-resistant coating can have a predetermined thickness at a selective location (i.e., a coating with a selectively variable thickness).

Figure 1B:
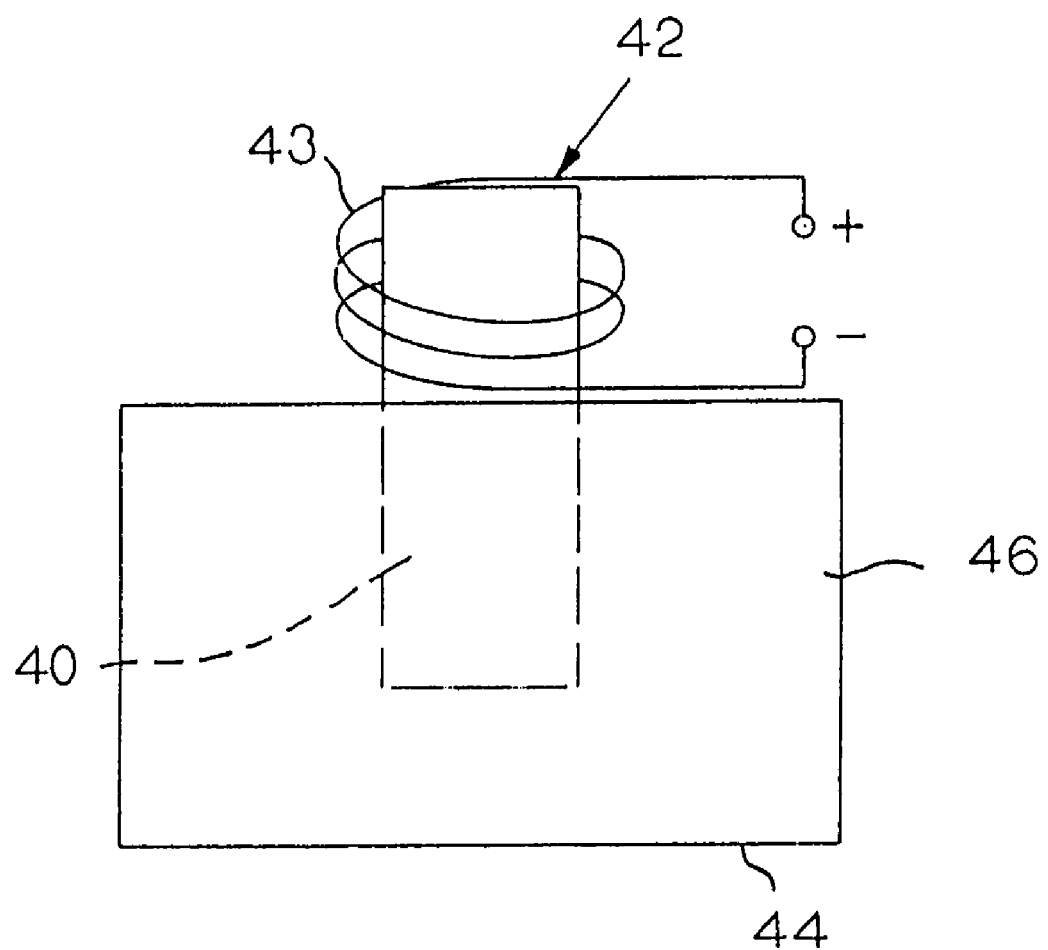
FIG. 1B is a mechanical schematic view of a third specific embodiment for applying a coating to a substrate wherein an electro-magnetic field is applied to the substrate.

FIG. 1B illustrates still another specific embodiment of the arrangement to apply the viscous coating to the substrate. In this arrangement, the substrate 40 is subjected to an electro-magnetic field via electro-magnetic apparatus 42 wherein an electric current-carrying wire 43 surrounds one portion of the substrate 40. In order to apply the coating, the substrate 40 is immersed into a container 44 that contains the viscous coating 46. The substrate 40 is then removed from the container 44 and the coating is allowed to dry and solidify. As will become apparent from the discussion below, the electro-magnetic field can either be immediately removed from the substrate after the substrate has been removed from the viscous coating material or the electro-magnetic field may be continuously applied to the substrate until the coating has dried, i.e., become solid. As another alternative, the electro-magnetic field can be increased during the solidification process. As still another alternative, the electro-magnetic field can be decreased (but not completely removed) during the solidification process.

In regard to the application of the magnetic field, applicant contemplates that where the solidifying step comprises a drying step that forms a dried coating and a heating step that transforms the dried coating into the wear-resistant coating, the influence of the magnetic field can be changed after the applying step and prior to the drying step. More specifically, as one alternative, the influence of the magnetic field can be decreased after the applying step and prior to the drying step. As another alternative, the influence of the magnetic field can be removed after the applying step and prior to the drying step. As still another alternative, the influence of the magnetic field can be increased after the applying step and prior to the drying step.

Applicants also contemplate that where the solidifying step comprises a drying step that forms a dried coating and a heating step that transforms the dried coating into the wear-resistant coating, and the influence of the magnetic field can be maintained through the completion of the drying step.

Applicants also contemplate that an arrangement to apply the viscous coating can have the magnetic field located about the substrate during all or part of the coating process. More specifically, the substrate does not itself have to be magnetically permeable, but instead, a magnetic field is applied so as to be about the surface of the substrate (or in the vicinity of the surface of the substrate). In this regard, a suitable substrate can be a titanium substrate or a titanium-based substrate, as well as a ceramic substrate.

Applicants further contemplate that the arrangement to apply the viscous coating can have the magnetic field applied through the viscous coating material. In this regard, the substrate does not have to be magnetically permeable, but only that the magnetic field pass through the viscous coating during all or part of the coating process. For the arrangement in which the magnetic field passes through the viscous coating, a suitable substrate can be a titanium substrate or a titanium-based substrate, as well as a ceramic substrate.

Referring to the viscous coating material, the preferred hard particles comprise cobalt cemented tungsten carbide particles. In regard to the composition of the cobalt cemented tungsten carbide particles, these particles comprise between about 5.5 weight percent and about 6.8 weight percent cobalt and between about 93.2 weight percent and about 94.5 weight percent tungsten carbide. In another compositional range, these particles comprise between about 5.5 weight percent and about 10.5 weight percent cobalt and between about 89.5 weight percent and about 94.5 weight percent tungsten carbide. The tungsten carbide particles have a size that ranges between about 37 micrometers and about 53 micrometers.

The braze material can comprise any one or more of the following: nickel, chromium, boron, silicon, iron, aluminum, gold, copper, manganese, copper-based alloys, aluminum-based alloys, other precious metals and alloys thereof. A preferred braze material is a nickel-chromium-boron braze alloy that has the following compositions: 4.0 wt. % B, 15.5 wt. % Cr and remainder Ni.

The viscous coating material further includes a polymeric agent. The polymeric agent can be selected from the group comprising one or more of crosslinked, acrylic emulsions. A preferred polymeric agent is an acrylate polymer that is sold by Rohm and Haas under the name Acrysol ASE-60.

A number of tests were run to evaluate the process of the present invention. These tests are described along with the results hereinafter. For all of the tests set out below, the substrate comprised a one inch (2.54 centimeters) by three inch (7.62 centimeters) steel coupon having a thickness equal to about 0.250 inches (6.35 millimeters). The substrate was made out of AISI 1018 steel. For all of the tests, the viscous coating material comprised a water-based paint that contained cobalt cemented tungsten carbide particles and a nickel-chromium-boron braze alloy and an acrylate polymer to hold the particles in suspension. The paint was thixotropic. The paint had a viscosity of 160,000 CP as measured with a Brookfield viscometer rotating at 0.5 rotations per minute (according to ASTM Standard D2196) and had a density of about 5.0 grams per cubic centimeter as measured according to ASTM Standard D1475. The pH of the paint was neutral to slightly basic as measured according to ASTM Standard E70.

The paint used in the tests was made according to the method as outlined in U.S. Pat. No. 6,649,682. More specifically, the following components were mixed together: 1.890 milliliters (ml) of water, 42 grams of Surfynol 75 made and sold by Air Products, Inc., 27 ml of a solution of 5% by weight of ammonia in water, 9630 grams of cemented tungsten carbide (6 weight percent cobalt and the balance tungsten carbide) with a mean grain size equal to 44 microns, and 8667 grams of a nickel (balance)-chromium (15.5 weight percent)-boron (4.0 weight percent) eutectic braze alloy. Then 78 ml of Acrysol 60 thickening agent was titrated into the mixture as it was being stirred wherein the resulting viscosity was as set forth above.

Tests were conducted to identify the differences between the coating layer on the substrate due to the application of a magnetic field to the substrate during the immersion of the substrate in the viscous coating material and, as an option, during the drying of the coating on the substrate. More specifically, in one test, i.e., Sample A, the magnetic field was applied to one side surface (i.e., the near side surface) of the substrate only during the immersion of the substrate in the viscous coating material. In these tests the magnet was immediately removed after removing the substrate from the viscous coating material. In another test, i.e., Sample B, the magnet was applied to the near side surface of the substrate during the immersion of the substrate in the viscous coating material and was left on the substrate until after the coating had dried.

The testing included one Control Sample. The Control Sample did not have a magnet attached thereto at any time during the immersion of the substrate in the viscous coating material or during the drying of the coating on the substrate.

Referring now to the control test, the Control Sample was immersed (or dipped) into the viscous coating material (i.e., the paint). A magnetic field was not applied to the substrate of the Control Sample. The control substrate was then removed from the viscous coating material, and then allowed to dry at room temperature for twenty-four hours.

Figure 2:
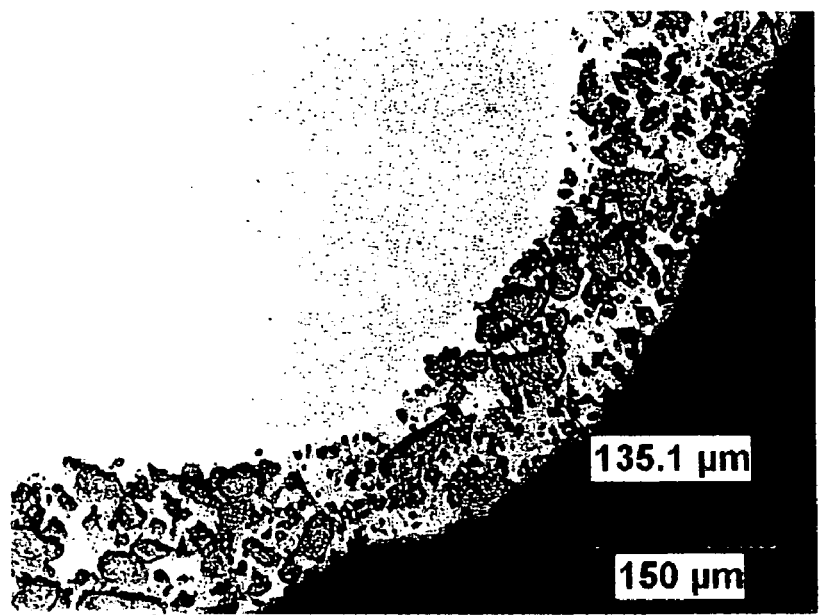
FIG. 2 is a colorized photomicrograph (with a scale of 150 micrometers) that shows the coating layer at a corner of the Control Sample and the photomicrograph shows the coating to have a thickness equal to about 135.1 micrometers.
Figure 3:
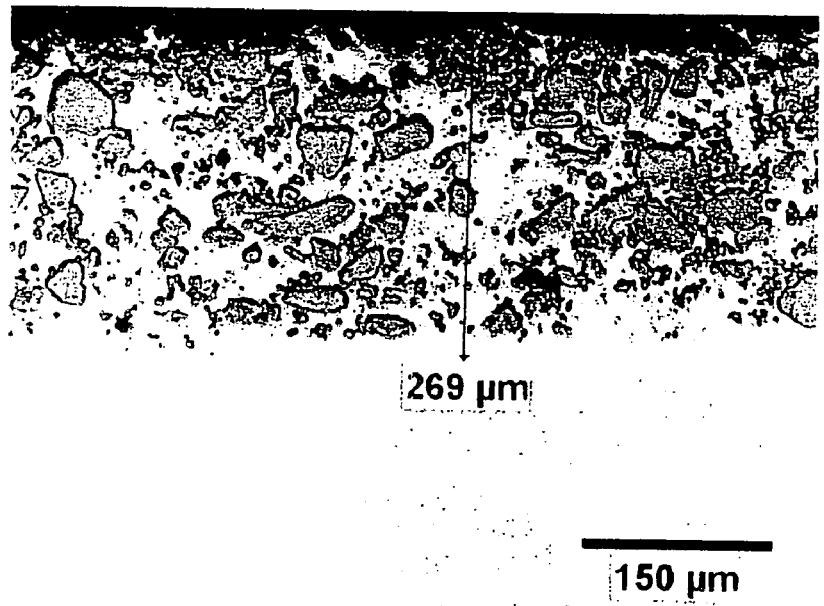
FIG. 3 is a colorized photomicrograph (with a 150 micrometer scale) that shows the coating layer at a side surface of the Control Sample and the photomicrograph shows the coating to have a thickness equal to about 269 micrometers.

In regard to the thickness of the coating layer on the Control Sample, FIGS. 2 and 3 comprise photomicrographs that show the microstructure of the coating layer at two different locations on the substrate of the Control Sample. FIG. 2 shows the coating layer at a corner of the substrate wherein the thickness of the coating layer at a corner of the substrate of the Control Sample is about 135.1 micrometers. FIG. 3 shows the coating layer at one side surface of the substrate wherein the thickness of the coating layer on the side surface of the substrate of the Control Sample is about 269 micrometers. The Control Sample represents what has been done in the past in a process in which the substrate is immersed in a viscous coating material, removed from the viscous coating material, and then allowed to air dry, and wherein a magnetic field is not applied to the substrate at any time during the entire coating process.

In one (Sample A) specific embodiment of the process of the invention, a magnet was attached to one side surface (or the near side surface) of the substrate. The substrate (with the magnet attached thereto) was immersed into the viscous coating material. The substrate was removed from the viscous coating and the magnet was immediately removed from the substrate. The substrate was then allowed to dry at room temperature for twenty-four hours so as to form Sample A.

Figure 4:
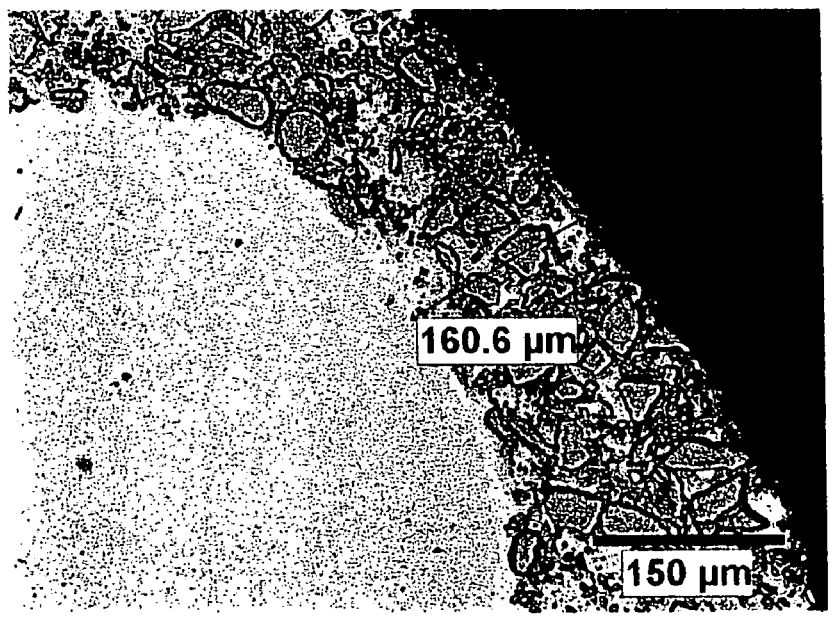
FIG. 4 is a colorized photomicrograph (with a 150 micrometer scale) that shows the coating layer at a corner of a specific embodiment (Sample A) wherein the substrate was immersed in the viscous coating material with a magnet applied to one side surface (near side surface) of the substrate, but the magnet was immediately removed after the substrate was removed from the viscous coating material, and the photomicrograph shows the coating to have a thickness equal to about 160.6 micrometers.
Figure 5:
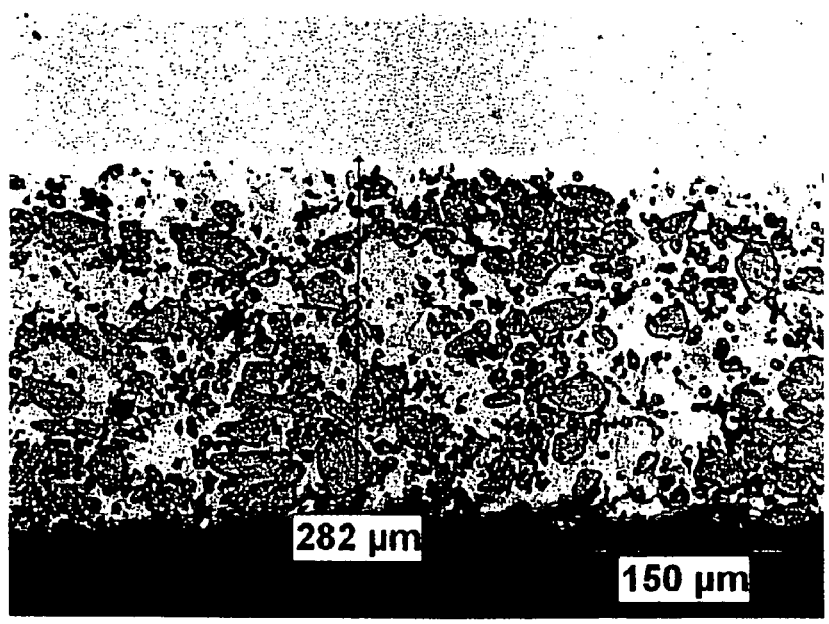
FIG. 5 is a colorized photomicrograph (with a 150 micrometer scale) that shows the coating on the opposite side surface of the substrate opposite to the side on which the magnet was attached for Sample A, and the photomicrograph shows the coating to have a thickness equal to about 282 micrometers.
Figure 6:
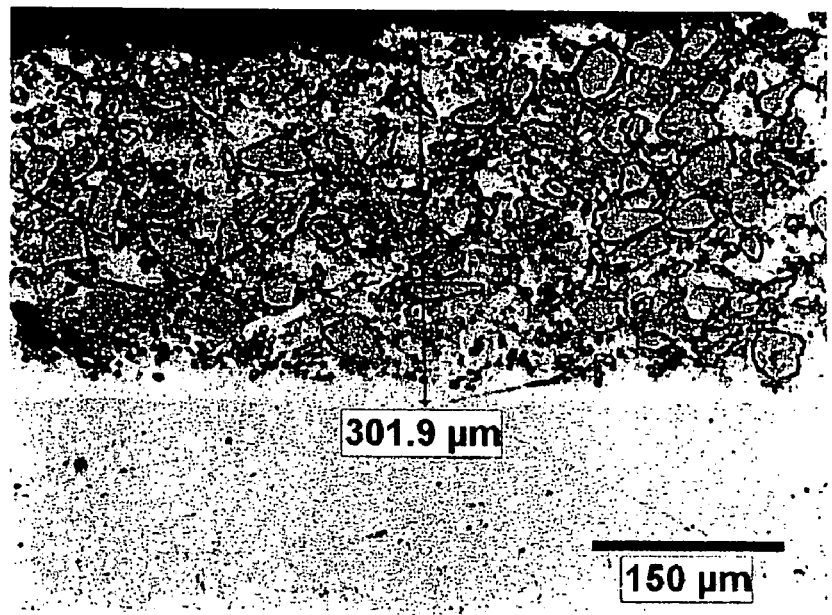
FIG. 6 is a colorized photomicrograph (with a 150 micrometer scale) that shows the coating on the near side surface of the substrate on which the magnet was attached for Sample A, and the photomicrograph shows the coating to have a thickness equal to about 301.9 micrometers.

FIGS. 4-6 comprise photomicrographs that show the coating layer on the substrate of Sample A at three different locations. FIG. 4 shows the coating at a corner of the substrate of Sample A wherein the thickness of the coating is about 160.6 micrometers. FIG. 5 shows the coating on the opposite side surface of the substrate (of Sample A) that was opposite to the near side surface on which the magnet was attached prior to removal. As shown in FIG. 5, the thickness of the coating layer on the opposite side surface of the substrate of Sample A is about 282 micrometers. FIG. 6 shows the coating layer on the near side surface of the substrate of Sample A where the magnet was originally attached prior to removal from the substrate. As shown in FIG. 6, the thickness of the coating layer on the near side surface of the substrate of Sample A is about 301.9 micrometers.

In (Sample B) a second specific embodiment of the process of the invention, a substrate that had a magnet attached to the near side surface thereof was immersed into the viscous coating material. The substrate was removed from the viscous coating material and allowed to air dry at room temperature for twenty-four hours. The magnet remained attached to the substrate until the coating material had solidified.

Figure 7:
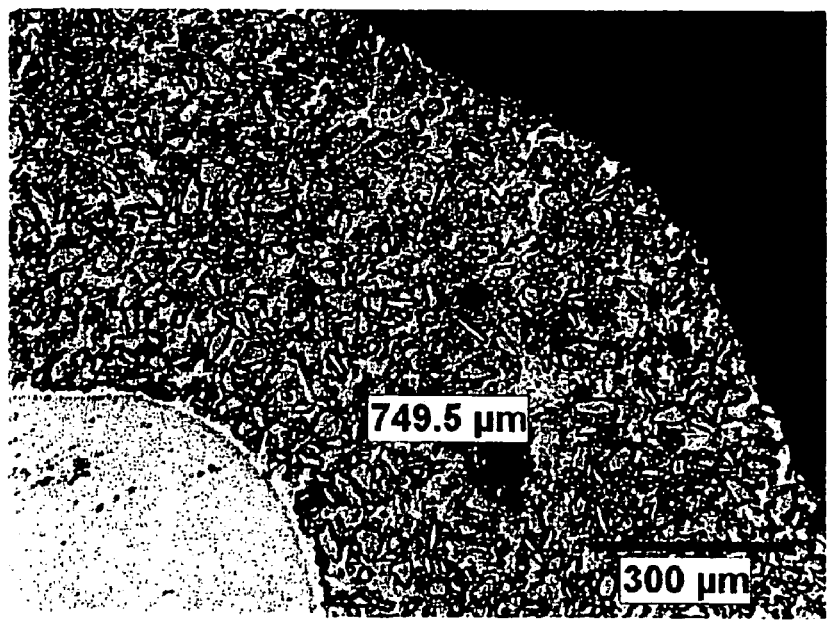
FIG. 7 is a colorized photomicrograph (with a 300 micrometer scale) that shows the coating at a corner of the substrate of Sample B wherein the substrate was immersed in the viscous coating with a magnet applied to the substrate and the magnet was not removed from the substrate until after the coating had solidified, and the photomicrograph shows the coating to have a thickness equal to about 749.5 micrometers.
Figure 8:
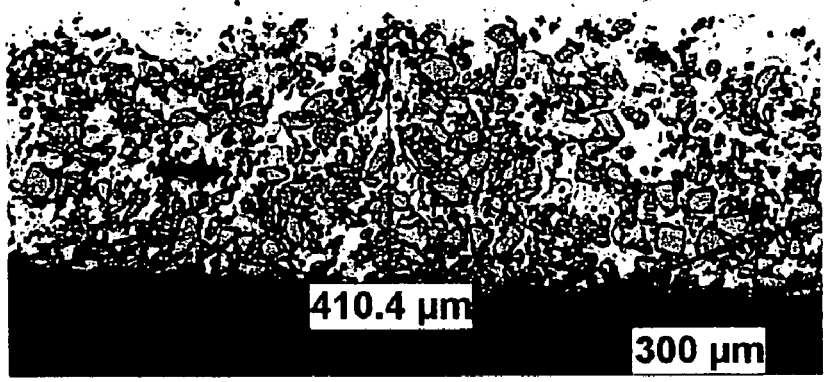
FIG. 8 is a colorized photomicrograph (with a 300 micrometer scale) that shows the coating on the opposite side surface of the substrate opposite from that to which the magnet was applied for Sample B, and the photomicrograph shows the coating to have a thickness equal to about 410.4 micrometers.
Figure 9:
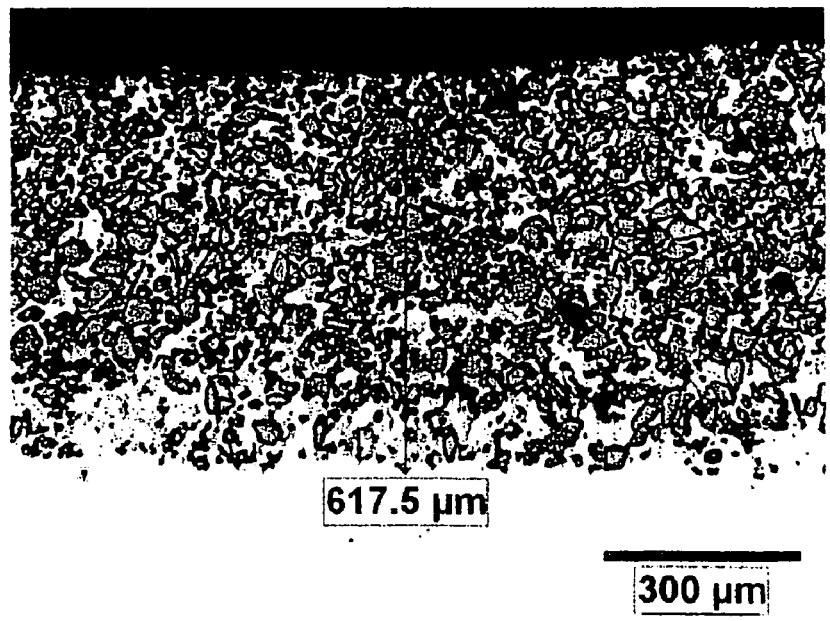
FIG. 9 is a colorized photomicrograph (with a 300 micrometer scale) that shows the coating on the near side surface of the substrate to which the magnet was applied for Sample B, and the photomicrograph shows the coating to have a thickness equal to about 617.5 micrometers.

FIGS. 7-9 show the coating layer at different locations, i.e., at one corner, at the opposite side surface and at the near side surface, on the substrate for Sample B. As illustrated in FIG. 7, the coating layer at a corner of the substrate of Sample B has a thickness equal to about 749.5 micrometers. As illustrated in FIG. 8, the thickness of the coating layer on the opposite side surface of the substrate that was opposite to the side surface where the magnet was attached is equal to about 410.4 micrometers. FIG. 9 illustrates the coating layer on the near side surface of the substrate wherein a magnet was affixed during the complete process to produce the solidified coating. As illustrated in FIG. 9, the coating layer on the near side surface has a thickness equal to about 617.5 micrometers.

Table I below sets forth the thickness of the coating layer for the Control Sample and Samples A and B at different locations on the substrate.

TABLE I

The Thickness of Coating Layers at a Corner, the Near Side Surface and the Opposite Side Surface

| Sample | Corner Thickness of Coating (micrometers) | Opposite Side Surface Thickness of Coating (micrometers) | Near Side Surface Thickness of Coating (micrometers) |
|---|---|---|---|
| Control | 135.1 | 269 | 269 |
| A [magnet removed after removal from coating material] | 160.6 | 282 | 301.9 |
| B [magnet retained until after coating dried] | 749.5 | 410.4 | 617.5 |

As can be seen from the information set forth in Table I, it is very apparent that the application of a magnetic field to the substrate increased the thickness of the coating layer.

It is generally understood and accepted that for the geometry, i.e., a solid rectangular geometry, of the substrates of the Control Sample and Samples A and B, the strength of a magnetic field applied to such a substrate is strongest at the corners of the substrate. For the substrates of the Control Sample and Samples A and B, it is also understood and well-accepted that the strength of a magnetic field applied to the substrate via a magnet attached to the near side surface, would be stronger on the near side surface to which the magnet is attached than on the opposite side surface. Keeping these principles in mind, the coating thickness data set forth in Table I show that an increase in the strength of the magnetic field applied to the surface (or corners) of the substrate results in an increase in the thickness of the coating layer at that location on the substrate.

Referring to the thickness of the coating layer at the corner of the substrate (the location where the strength of the magnetic field would be expected to be the greatest), when the magnetic field was applied only during the immersion of the substrate in the viscous coating material, the coating thickness increased to equal about 118 percent of the coating thickness for the Control Sample. However, when the magnetic field was applied during the entire coating process (i.e., immersion and drying), the coating thickness increased to equal about 555 percent of the coating thickness for the Control Sample.

Referring to the thickness of the coating layer on the opposite side surface of the substrate (the location where the strength of the magnetic field would be the weakest), when the magnetic field was applied only during the immersion of the substrate in the viscous coating material, the coating thickness increased to equal about 104 percent of the coating thickness for the Control Sample. When the magnetic field was applied during the entire coating process (i.e., immersion and drying), the coating thickness increased to equal about 152 percent of the coating thickness for the Control Sample.

Referring to the thickness of the coating layer on the near side surface of the substrate (the location where the strength of the magnetic field would be between the greatest and the weakest), when the magnetic field was applied only during the immersion of the substrate in the viscous coating material, the coating thickness increased to equal about 112 percent of the coating thickness for the Control Sample. However, when the magnetic field was applied during the entire coating process (i.e., immersion and drying), the coating thickness increased to equal about 230 percent of the coating thickness for the Control Sample.

A review of the above results shows that the application of a magnetic field to the substrate can increase the coating (or cladding) thickness multiple times over a substrate on which there is no magnetic field. From a practical point of view what this means is that fewer immersions (or dips) of the substrate into the viscous coating material are needed to achieve a coating layer of a satisfactory thickness. This, in turn, means that fewer drying steps, which occur between each coating step, are necessary. Each one of these practical advantages leads to better productivity in the process of applying the coating to a substrate. Further, it is apparent that the application of a magnetic field increased the thickness of the coating layer along the corners (i.e., sharp edges) of the substrate so as to help with certain applications, especially those wherein the substrate has several edges or sharp corners.

It is thus apparent that the present invention provides a process, as well as an article produced by the process, wherein the coating is not subject to oxidation such as is the case for coatings applied by thermal spray techniques.

It is also apparent that the present invention provides a process, as well as an article produced by the process, wherein the coating can be applied in a consistent fashion to the substrate so as to result in a uniform or controlled variable coating.

It is thus apparent that the present invention provides a process, as well as an article produced by the process, wherein the coating can be a relatively thin coating.

It is thus apparent that the present invention provides a process, as well as an article produced by the process, wherein the coating can be applied to components or surfaces of components that are not accessible by hand or tools.

It is thus apparent that the present invention provides a process, as well as an article produced by the process, wherein the coating is without seams.

It is thus apparent that the present invention provides a process, as well as an article produced by the process, wherein it would not be necessary to use multiple coats or dips of a coating paint on a substrate to achieve the necessary cladding thickness.

It is thus apparent that the present invention provides a process, as well as an article produced by such process, wherein the thickness of the cladding is sufficient at sharp corners or edges of the substrate so as to provide adequate wear resistance.

It is thus apparent that the present invention provides a coating process, as well as an article produced by such process, wherein the thickness of the coating (or cladding) at selected locations can be varied so that the substrate can have a coating that has a selectively variable thickness.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. An article produced by a process comprising the steps of:
providing a first substrate;
applying a first pre-selected amount of a viscous coating that contains a ferromagnetic or paramagnetic component to at least a selected portion of the first substrate and wherein the viscous coating comprises hard particles and a braze material, and the hard particles comprise the ferromagnetic or paramagnetic component of the viscous coating;

causing the selected portion of the first substrate to be under the influence of a magnetic field; and transforming the first pre-selected amount of the viscous coating while under the influence of the magnetic field so as to form a magnetically-influenced wear-resistant coating on the first substrate, and wherein the magnetically-influenced wear-resistant coating having a magnetically-influenced content of the hard particles as measured by area, the magnetically-influenced content of the hard particles as measured by area being greater than a magnetically-uninfluenced content of the hard particles as measured by area of a wear-resistant coating formed from transforming a second pre-selected amount of the viscous coating applied to a second substrate wherein the second substrate not being under the influence of a magnetic field, and wherein the first pre-selected amount of the viscous coating being equal to the second pre-selected amount of the viscous coating, and the first substrate being the same as the second substrate.

2. The article according to claim 1 wherein the substrate comprises a magnetically permeable material selected from the group comprising of carbon and alloy steels, tool steels, and martensitic and ferritic stainless steels.

3. The article according to claim 2 wherein the causing step occurs prior to the applying step.

4. The article according to claim 2 wherein the causing step comprises causing a plurality of discrete portions of the substrate to be under the influence of a magnetic field.

5. The article according to claim 1 wherein the substrate comprises a non-magnetic material, and the non-magnetic material comprising a material is selected from the group comprising an aluminum alloy, a titanium alloy and a ceramic.

6. The article according to claim 5 wherein the substrate having a surface, and the causing step comprises causing a magnetic field in the vicinity of the surface of the substrate.

7. The article according to claim 1 wherein the braze material further comprises the ferromagnetic or paramagnetic component of the viscous coating.

8. The article according to claim 7 wherein the hard particles comprise a binder cemented carbide wherein the binder is selected from the group consisting of one or more of cobalt, iron, copper-based alloys, aluminum-based alloys, nickel and alloys thereof and the carbide is selected from the group consisting of one or more of tungsten carbide, vanadium carbide, niobium carbide, chromium carbide, titanium carbide and tantalum carbide, and the braze material contains one or more elements selected from the group comprising nickel, chromium, boron, silicon, iron, copper-based, aluminum-based alloys, and alloys thereof.

9. The article according to claim 1 wherein the transforming step comprises a drying step that forms a dried coating and a heating step that transforms the dried coating into the wear-resistant coating, and the influence of the magnetic field is changed after the applying step and prior to the drying step.

10. The article according to claim 1 wherein the transforming step comprises a drying step that forms a dried coating and a heating step that transforms the dried coating into the wear-resistant coating, and the influence of the magnetic field is removed after the applying step and prior to the drying step.

11. The article according to claim 1 wherein the transforming step comprises a drying step that forms a dried coating and a heating step that transforms the dried coating into the wear-resistant coating, and the causing step is maintained through the completion of the drying step.

12. The article according to claim 1 wherein the magnetically-influenced thickness being at least about 150 percent of the magnetically-uninfluenced thickness.

13. The article according to claim 1 wherein the magnetically-influenced thickness being at least about 500 percent of the magnetically-uninfluenced thickness.

14. An article produced by a process comprising the steps of:

providing a substrate;

contacting the substrate with a viscous coating wherein the viscous coating contains a ferromagnetic or paramagnetic component;

causing at least a portion of the viscous coating to be under the influence of a magnetic field, and wherein the causing step comprises causing only a discrete portion of the viscous coating to be under the influence of the magnetic field so that a second portion of the viscous coating is not under the influence of the magnetic field; and transforming the viscous coating into a wear-resistant coating adhered to the substrate wherein the wear-resistant coating has a thickness, and the thickness of the wear-resistant coating in the portion of the viscous coating under the influence of the magnetic field being greater than the thickness of the wear-resistant coating in the portion of the viscous coating not under the influence of the magnetic field.

15. The article according to claim 14 wherein the viscous coating contains hard particles and braze material, and either one or both of the hard particles or braze material comprises the ferromagnetic or paramagnetic component.

16. The article according to claim 14 wherein the causing step occurs prior to the contacting step.

17. An article produced by a process comprising the steps of:

providing a substrate;

contacting the substrate with a viscous coating wherein the viscous coating contains a ferromagnetic or paramagnetic component;

causing at least a portion of the viscous coating to be under the influence of a magnetic field, and wherein the causing step comprises causing a plurality of discrete portions of the viscous coating to be under the influence of a magnetic field; and transforming the viscous coating into a wear-resistant coating adhered to the substrate wherein the wear-resistant coating has a thickness, and the thickness of the wear-resistant coating in each one of the portions of the viscous coating under the influence of the magnetic field being greater than the thickness of the wear-resistant coating in the portion of the viscous coating not under the influence of the magnetic field.

18. An article produced by a process comprising the steps of:

providing a magnetically permeable substrate;

causing at least a selected portion of the substrate to be under the influence of a magnetic field;

contacting the selected portion of the substrate with a viscous coating wherein the viscous coating contains hard particles and a braze material wherein the viscous coating contains a ferromagnetic or paramagnetic component; and transforming the viscous coating while under the influence of the magnetic field to a magnetically-influenced wear-resistant coating adhered to the substrate, and wherein a ratio of the hard particles to the braze material in the magnetically-influenced wear-resistant coating is greater than a ratio of the hard particles to the braze material in the viscous coating.

19. The article according to claim 18 wherein the hard particles comprise cobalt cemented tungsten carbide particles and the braze material contains nickel and chromium and boron.

20. The article according to claim 18 wherein the magnetically-influenced thickness being at least about 150 percent of the magnetically-uninfluenced thickness.

21. The article according to claim 18 wherein the magnetically-influenced thickness being at least about 500 percent of the magnetically-uninfluenced thickness.

* * * * *